(12) United States Patent
Arnabat Castellvi

(10) Patent No.: US 8,037,944 B2
(45) Date of Patent: *Oct. 18, 2011

(54) FASTENING DEVICE FOR COUPLING PLOUGHING ELEMENTS IN AGRICULTURAL CULTIVATION MACHINES

(75) Inventor: Carles Arnabat Castellvi, Barcelona (ES)

(73) Assignee: Digger Tools, S.L., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 12/664,065

(22) PCT Filed: Jun. 5, 2008

(86) PCT No.: PCT/ES2008/000410
§ 371 (c)(1),
(2), (4) Date: Dec. 11, 2009

(87) PCT Pub. No.: WO2008/152166
PCT Pub. Date: Dec. 18, 2008

(65) Prior Publication Data
US 2010/0170687 A1    Jul. 8, 2010

(30) Foreign Application Priority Data
Jun. 12, 2007   (ES) .................................. 200701614

(51) Int. Cl.
*A01B 15/00* (2006.01)
(52) U.S. Cl. ........................................ 172/762; 172/753
(58) Field of Classification Search .................. 172/762, 172/753
See application file for complete search history.

(56) References Cited

U.S. PATENT DOCUMENTS

| 4,867,248 | A |   | 9/1989  | Robertson et al. |           |
|-----------|---|---|---------|------------------|-----------|
| 5,711,378 | A | * | 1/1998  | Yeager           | 172/730   |
| 6,315,057 | B1| * | 11/2001 | Borter           | 172/753   |
| 6,571,884 | B1| * | 6/2003  | Horvath et al.   | 172/730   |
| 7,210,540 | B2| * | 5/2007  | Ward et al       | 172/772.5 |
| 7,255,179 | B2| * | 8/2007  | Pollard          | 172/683   |
| 7,493,964 | B2| * | 2/2009  | Henry et al.     | 172/762   |

FOREIGN PATENT DOCUMENTS

| DE | 3628910 A1 | 3/1988 |
| ES | 1021287 U  | 11/1992 |
| ES | 2256100 T3 | 7/2006 |
| FR | 2621210 A1 | 4/1989 |

* cited by examiner

*Primary Examiner* — Robert Pezzuto
*Assistant Examiner* — Jamie L McGowan
(74) *Attorney, Agent, or Firm* — Richard M. Goldberg

(57) ABSTRACT

Fastening device for coupling ploughing elements in agricultural cultivation machines, the ploughing elements including ploughshares, points, blades or any similar type of tool, the fastening device including an intermediate fastening element, formed by a solid body, which joins the ploughing element to the support arm; the intermediate fastening element being equipped with a fastening arrangement for linking thereof to the support arm; a guiding arrangement for insertion of the former inside the ploughing element; and an aperture, passable transversely with respect to the direction of the guiding arrangement and intended for insertion of a retractable pin which, in an insertion position for the pin, acts as a retaining element for the ploughing element with respect to the intermediate fastening element such that the fastening device enables the user/operator to manually replace or reposition the ploughing element, avoiding any need for accessory tools for this purpose.

4 Claims, 2 Drawing Sheets

FASTENING DEVICE FOR COUPLING PLOUGHING ELEMENTS IN AGRICULTURAL CULTIVATION MACHINES

AIM OF THE INVENTION

The aim of this Utility Model is to register a fastening device for coupling ploughing elements in agricultural cultivation machines, which includes important innovative elements and advantages over current fastening device arrangements used for the same purpose.

More specifically, the device of the invention allows the user-operator to changeover and/or replace the ploughing element through a simple manual action, without using accessory tools such as specific wrenches, hammers, etc., used for this purpose.

BACKGROUND TO THE INVENTION

Current agricultural cultivation machines comprise a frame having a plurality of support arms on which the ploughing elements such as ploughshares, points, blades or the like are attached or linked.

It is known that the ploughing elements are linked to the support arms by common screws, which implies using auxiliary tools to change or replace the ploughing element, or, screws with special properties, particularly designed for this function, and which require the use of a type of specific tool for handling.

DESCRIPTION OF THE INVENTION

The fastening device for coupling ploughing elements in agricultural cultivation machines, which is the object of this invention, resolves the previously mentioned drawbacks, and also provides other additional advantages that will become evident from the following attached description.

The device of the invention is particularly designed for linking ploughshares, points, blades, or any type of ploughing tool, to a support arm that is part of the actual cultivation machine.

To this end, and more specifically said device is characterized in that it comprises an intermediate fastening element, made up of a solid body, which links the ploughing element to the support arm; with said intermediate fastening element being provided with fastening means for linking it to the support arm; guiding means for inserting it into the ploughing element; and at least one through hole transverse to the direction of the guiding means, intended for inserting a removable pin which, in an inserted position of said pin, acts like a retention element for the ploughing element with respect to the intermediate fastening element.

According to the characteristics mentioned, the intermediate fastening element has a shoulder that projects from the end of the solid body not inserted into the ploughing element, like an upper end. To this effect, the through hole is positioned in the fastening element slightly below the shoulder arranged for inserting the removable pin.

Based on the characteristics described, in a preferred embodiment, the intermediate fastening element is arranged longitudinally with respect to the support arm. This means that the ploughing element slides vertically on the intermediate fastening element, fitting into the guiding means provided on said intermediate element, and as far as the upper shoulder thereof, with the ploughing element ending up attached to the top of said shoulder.

According to another aspect of the invention, the means for coupling the intermediate fastening element to the support arm consist of at least one bore hole for inserting a fastening screw that links the intermediate fastening element to the support arm.

Advantageously, and by virtue of the particular characteristics of the described invention, a device is obtained which makes it possible to change the ploughing element manually, without using auxiliary tools (wrenches, hammers, etc.).

It allows for the changeover or replacement of said element owing to wear or breakage thereof by simply acting manually on the pin that acts as a retaining element.

In order to complete the following description, and to facilitate the comprehension of the characteristics thereof, a sheet of drawings accompanies this specification, which are an illustrative, non-limiting example of the most relevant details of the invention.

DESCRIPTION OF A PREFERRED EMBODIMENT

The mentioned figures and numbering show a preferred but not exclusive embodiment of the invention, which consists of a fastening device for coupling ploughing elements in agricultural cultivation machines.

The device of the invention is particularly designed for linking ploughshares, points, blades or any type of ploughing element, to a support arm (not shown) that is part of the actual cultivation machine.

Figure 1:
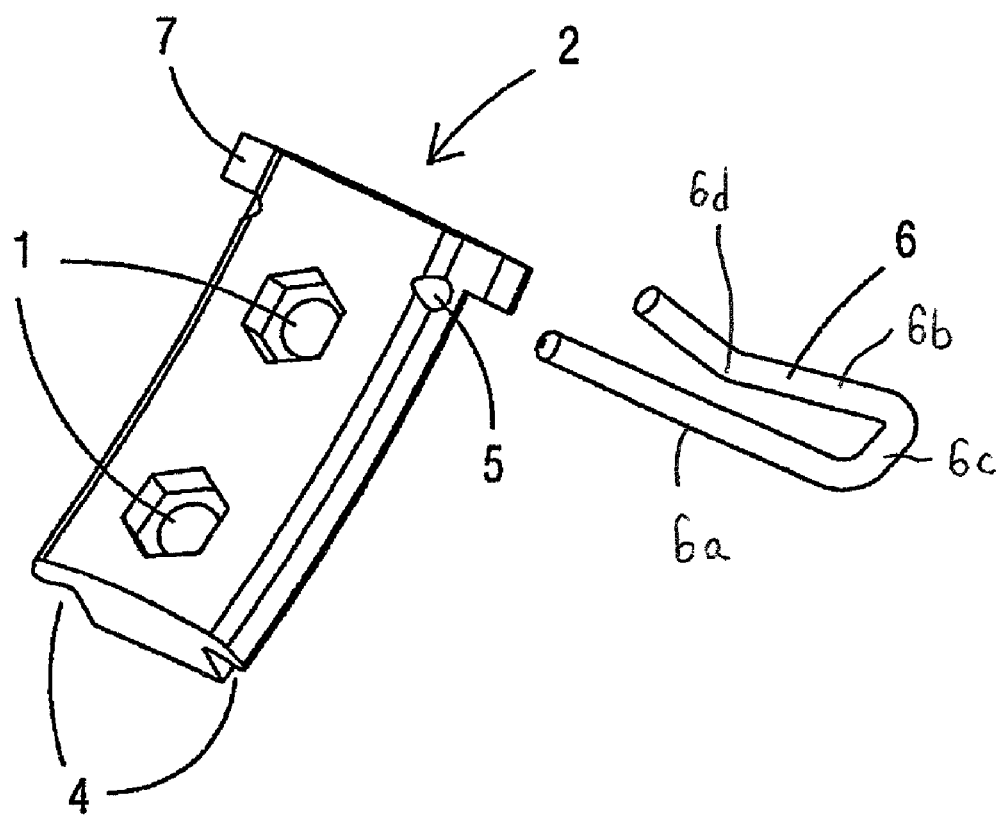
FIG. 1 corresponds to an elevation view of the intermediate fastening element according to the characteristics of the invention.
Figure 2:
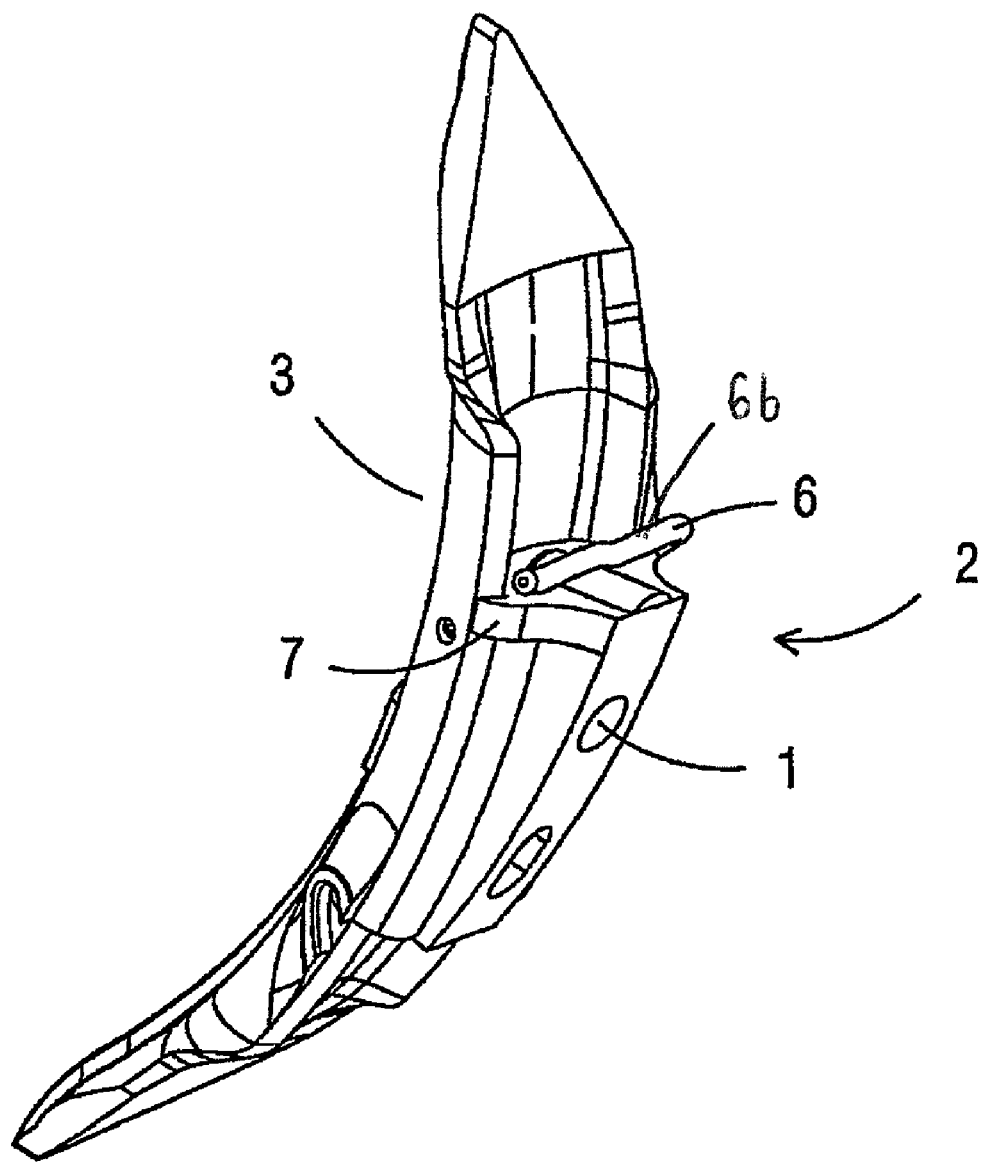
FIG. 2 corresponds to a perspective view of the arrangement of the invention.

As shown in FIGS. 1 and 2, the device of the invention is characterized in that it comprises an intermediate fastening element (2), made up of a solid body, which links the ploughing element (3) to the support arm; with said intermediate fastening element (2) being provided with fastening means (1) for linking it to the support arm; guiding means (4) for inserting it into ploughing element (3); and one through hole (5) transverse to the direction of guiding means (4), for inserting a removable pin (6) which, in an inserted position of said pin (6), acts as a retention element for ploughing element (3) with respect to intermediate fastening element (2).

According to the characteristics mentioned, intermediate fastening element (2) has a shoulder (7) that projects from the end of the solid body not inserted into ploughing element (3), like an upper end. Through hole (5) is positioned in fastening element (2) slightly below the shoulder (7) for inserting removable pin (6). The removable pin 6 has an R-shape with a linear portion 6a that extends into the one through hole 5, a V-shaped portion 6b connected to one end of the linear portion 6a by a connecting portion 6c, and the V-shaped portion 6b is positioned above the shoulder 7 of the solid body and has a downwardly extending apex 6d.

In particular, intermediate fastening element (2) is arranged longitudinally with respect to the support arm. To this end, ploughing element (3) slides vertically on intermediate fastening element (2), fitting into guiding means (4) provided on said element, and as far as its upper shoulder (7), with ploughing element (3) ending up attached to said shoulder.

According to another aspect of the invention, means (4) for coupling intermediate fastening element (2) to the support arm consist of at least one bore hole for inserting an attachment screw that links intermediate fastening element (2) to the support arm.

Advantageously, and by virtue of the particular characteristics of the invention described, a device is obtained that makes it possible to changeover or replace the ploughing element, owing to either wear or breakage, by simply acting manually on the pin that acts as a retention element.

The details, shapes, dimensions and other accessory elements, as well as the materials used to manufacture the fastening device for coupling ploughing elements in agricultural cultivation machines of the invention, can be conveniently replaced by other technically equivalent elements without departing from the nature of the invention or the scope defined by the claims attached below.

The invention claimed is:

1. Fastening device for coupling ploughing elements in an agricultural cultivation machine to a support arm that is part of the agricultural cultivation machine, comprising:
    an intermediate fastening element which attaches a ploughing element to the support arm, said intermediate fastening element including:
    a solid body;
    a fastening arrangement for attaching the intermediate fastening element to the support arm;
    a guiding arrangement extending in one direction for inserting the intermediate fastening element into the ploughing element; and
    one through hole transverse to the direction of the guiding arrangement; and
    a removable pin removably insertable into the one through hole and which, in an insertion position of said pin, acts as a retention element for the ploughing element with respect to intermediate fastening element, said removable pin having an R-shape with a linear portion that extends into the one through hole, a V-shaped portion connected to one end of the linear portion by a connecting portion, and said V-shaped portion is positioned above said solid body and has a downwardly extending apex.

2. Fastening device for coupling ploughing elements in an agricultural cultivation machine, according to claim 1, wherein the intermediate fastening element has a shoulder that projects from an upper end of the solid body and which is not inserted into the ploughing element; said through hole is positioned in the fastening element slightly below said shoulder, and said V-shaped portion is positioned above said shoulder.

3. Fastening device for coupling ploughing elements in an agricultural cultivation machine, according to claim 1, wherein the fastening arrangement includes at least one bore hole for inserting an attachment screw that connects the intermediate fastening element to the support arm.

4. Fastening device for coupling ploughing elements in an agricultural cultivation machine, according to claim 1, wherein said ploughing elements are selected from the group consisting of ploughshares, points and blades.

* * * * *